(12) United States Patent
Salles et al.

(10) Patent No.: US 11,407,428 B2
(45) Date of Patent: Aug. 9, 2022

(54) TRANSPORT SAFETY

(71) Applicant: TOYOTA MOTOR NORTH AMERICA, INC., Plano, TX (US)

(72) Inventors: Felipe G. Salles, Garland, TX (US); Shintaro Iwaasa, Frisco, TX (US); Louis Brugman, Frisco, TX (US); Devang H. Parekh, Dallas, TX (US); Robert D. Slater, Murphy, TX (US); Christopher J. Risberg, Flower Mound, TX (US); Nutonya L. Parker, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 171 days.

(21) Appl. No.: 16/827,637

(22) Filed: Mar. 23, 2020

(65) Prior Publication Data
US 2021/0291867 A1    Sep. 23, 2021

(51) Int. Cl.
| | |
|---|---|
| *G01C 22/00* | (2006.01) |
| *G05D 1/00* | (2006.01) |
| *B60W 60/00* | (2020.01) |
| *G06Q 50/26* | (2012.01) |
| *G06Q 50/30* | (2012.01) |
| *G06Q 10/06* | (2012.01) |

(Continued)

(52) U.S. Cl.
CPC .......... *B60W 60/0016* (2020.02); *B60Q 1/50* (2013.01); *B60W 40/09* (2013.01); *B60W 50/14* (2013.01); *B60W 60/0051* (2020.02); *G05D 1/0214* (2013.01); *G06N 20/00* (2019.01); *G06Q 10/06314* (2013.01); *G06Q 50/265* (2013.01); *G06Q 50/30* (2013.01); *H04L 67/12* (2013.01); *B60W 2050/143* (2013.01); *B60W 2050/146* (2013.01)

(58) Field of Classification Search
None
See application file for complete search history.

(56) References Cited

U.S. PATENT DOCUMENTS

| | | | |
|---|---|---|---|
| 6,906,639 | B2 | 6/2005 | Pedersen et al. |
| 9,619,203 | B2 | 4/2017 | Tamir et al. |

(Continued)

FOREIGN PATENT DOCUMENTS

| | | |
|---|---|---|
| CN | 101002239 B | 12/2010 |
| CN | 103035140 B | 9/2014 |

(Continued)

*Primary Examiner* — Mahmoud S Ismail

(57) ABSTRACT

An example operation includes one or more of determining automatically, by a processor based on data received from at least one sensor on a transport, a driving behavior associated with an operator of the transport over at least one first period of time as the operator's normal driving behavior, determining automatically by the processor a difference between the operator's normal driving behavior and a second driving behavior currently occurring over a second period of time as the operator's current driving behavior, and in the case the difference between the operator's normal driving behavior and the operator's current driving behavior indicates the operator's current driving behavior is unsafe, automatically guiding at least one of the operator and the transport to operate the transport in a safe driving behavior.

17 Claims, 13 Drawing Sheets

(51) Int. Cl.
*G06N 20/00* (2019.01)
*G05D 1/02* (2020.01)
*B60W 40/09* (2012.01)
*B60W 50/14* (2020.01)
*H04L 67/12* (2022.01)
*B60Q 1/50* (2006.01)

(56) References Cited

U.S. PATENT DOCUMENTS

| | | | |
|---|---|---|---|
| 9,711,050 B2 | 7/2017 | Ansari | |
| 9,868,394 B1* | 1/2018 | Fields | G08G 1/096758 |
| 9,870,649 B1* | 1/2018 | Fields | G08G 1/096791 |
| 10,019,901 B1* | 7/2018 | Fields | G06K 9/00805 |
| 10,026,237 B1* | 7/2018 | Fields | H04N 5/23241 |
| 10,163,350 B1* | 12/2018 | Fields | G07C 5/0816 |
| 10,242,513 B1* | 3/2019 | Fields | G08G 1/163 |
| 10,373,257 B1* | 8/2019 | Iqbal | G07C 5/08 |
| 10,916,131 B1* | 2/2021 | Schottland | B60W 30/0956 |
| 11,107,365 B1* | 8/2021 | Fields | H04W 4/02 |
| 2005/0131597 A1 | 6/2005 | Raz et al. | |
| 2010/0316255 A1* | 12/2010 | Mathony | G08G 1/09675 |
| | | | 382/103 |
| 2011/0043635 A1 | 2/2011 | Fujita et al. | |
| 2011/0153532 A1* | 6/2011 | Kuge | B60W 50/14 |
| | | | 706/12 |
| 2014/0278574 A1* | 9/2014 | Barber | G06Q 40/08 |
| | | | 705/4 |
| 2015/0106289 A1* | 4/2015 | Basir | G07C 5/08 |
| | | | 705/325 |
| 2015/0112546 A1* | 4/2015 | Ochsendorf | B60W 30/16 |
| | | | 701/33.4 |
| 2015/0328985 A1* | 11/2015 | Kim | B60W 40/08 |
| | | | 180/272 |
| 2015/0344038 A1 | 12/2015 | Stenneth et al. | |
| 2015/0353014 A1* | 12/2015 | Li | G06K 9/00845 |
| | | | 348/148 |
| 2016/0371553 A1* | 12/2016 | Farnham, IV | G07C 5/008 |
| 2017/0200061 A1* | 7/2017 | Julian | G06K 9/00845 |
| 2018/0107932 A1* | 4/2018 | Pandurangarao | G06N 7/00 |
| 2018/0308353 A1* | 10/2018 | He | B60Q 9/00 |
| 2019/0102840 A1* | 4/2019 | Perl | B60W 40/09 |
| 2020/0057487 A1* | 2/2020 | Sicconi | G06T 7/174 |
| 2020/0283003 A1* | 9/2020 | Raichelgauz | B60W 50/0097 |
| 2021/0094583 A1* | 4/2021 | Choi | B60W 50/14 |
| 2021/0166323 A1* | 6/2021 | Fields | G08G 1/0112 |

FOREIGN PATENT DOCUMENTS

| | | |
|---|---|---|
| CN | 102163368 B | 10/2014 |
| CN | 105261225 A | 1/2016 |
| CN | 109313445 A | 2/2019 |
| EP | 2165321 B1 | 12/2018 |
| KR | 101823994 B1 | 2/2018 |

* cited by examiner

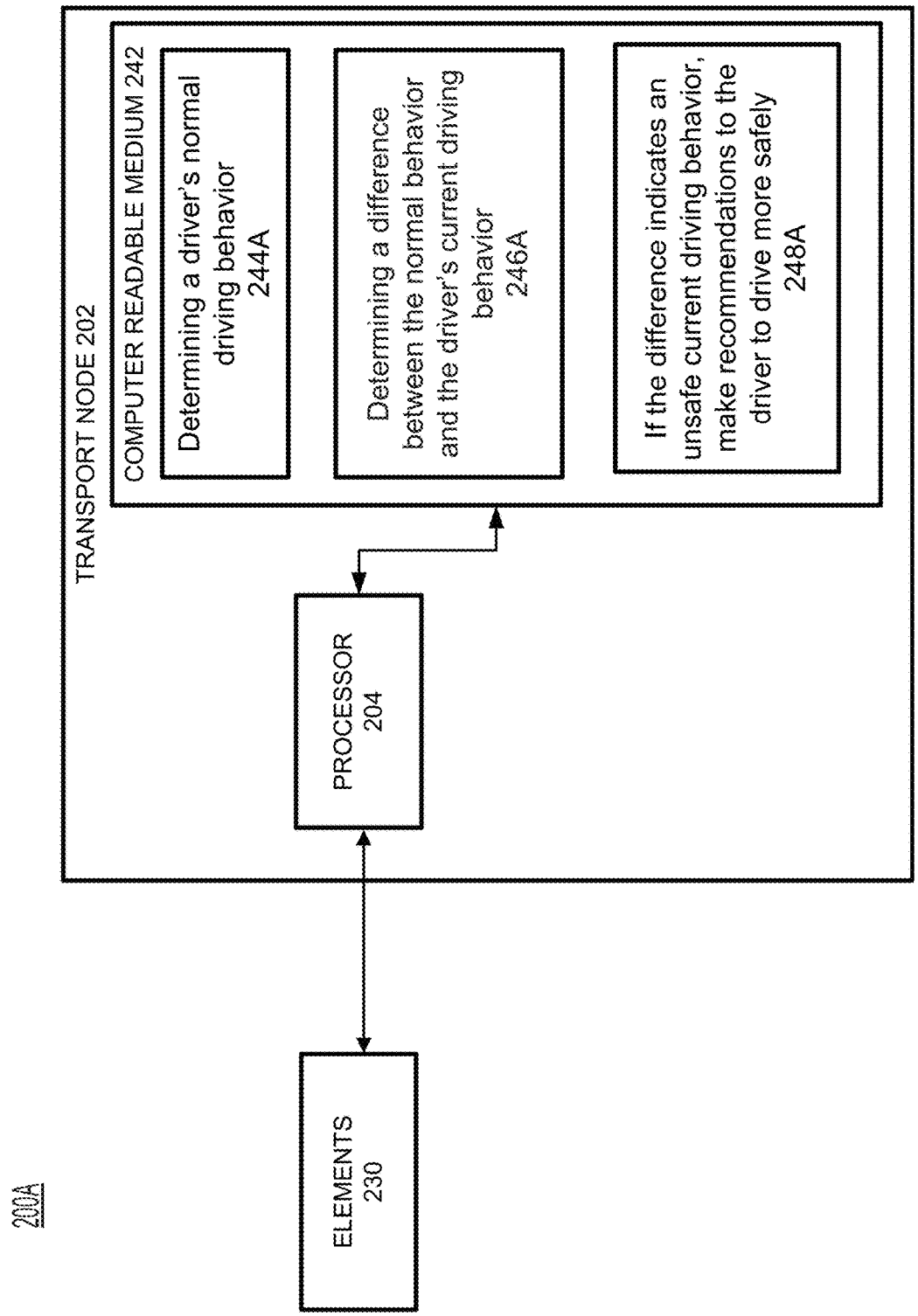

TRANSPORT SAFETY

TECHNICAL FIELD

This application generally relates to safety of a transport, and more particularly to improving transport safety.

BACKGROUND

Transports, such as cars, motorcycles, trucks, planes, trains, etc., generally provide transportation needs to occupants and/or goods in a variety of ways. Functions related to transports may be identified and utilized by various computing devices, such as a smartphone or a computer. Some of these functions pertain to driver safety.

Active safety systems are becoming available in an increasing number of new vehicles. Such systems have features to help protect the driver and passengers. For example using integrated cameras and radar, such systems may reduce the likelihood of a collision with other vehicles and pedestrians. However, systems cannot automatically adapt transport characteristics to enhance the safety of a particular driver, based on that driver's past and present performance. Accordingly, it is desirable to have a system that can overcome these limitations.

SUMMARY

Example embodiments provides methods that include one or more of determining automatically, by a processor based on data received from at least one sensor on a transport, a driving behavior associated with an operator of the transport over at least one first period of time as the operator's normal driving behavior, determining automatically by the processor a difference between the operator's normal driving behavior and a second driving behavior currently occurring over a second period of time as the operator's current driving behavior, and in the case the difference between the operator's normal driving behavior and the operator's current driving behavior indicates the operator's current driving behavior is unsafe, automatically guiding at least one of the operator and the transport to operate the transport in a safe driving behavior.

Another example embodiment provides a system that includes a transport operation safety enhancing system, comprising a processor, a data storage device operatively coupled to the processor that stores instructions and driving data, at least one sensor that senses current data associated with transport operation, wherein the processor compares the current data to prior data stored in the data storage device to detect unsafe transport operation, an alert device to alert the driver of an unsafe driving behavior, recommend a safe driving behavior, and determine if the recommendation was followed, and a transport operating mechanism operable to initiate and complete the safety measure.

A further example embodiment provides a non-transitory computer readable medium comprising instructions that, when executed by a processor, cause the processor to perform one or more of determining, by analyzing data from at least one sensor on a transport, a normal driving behavior associated with a particular operator of the transport over a first period of time, determining a difference between the operator's normal driving behavior and an alternate driving behavior currently occurring over a second period of time, and, when the difference indicates a dangerous driving behavior, issuing an alert or initiating and completing a safety measure.

BRIEF DESCRIPTION OF THE DRAWINGS

FIG. 2A illustrates a transport network diagram, according to example embodiments.

DETAILED DESCRIPTION

Figure 1A:
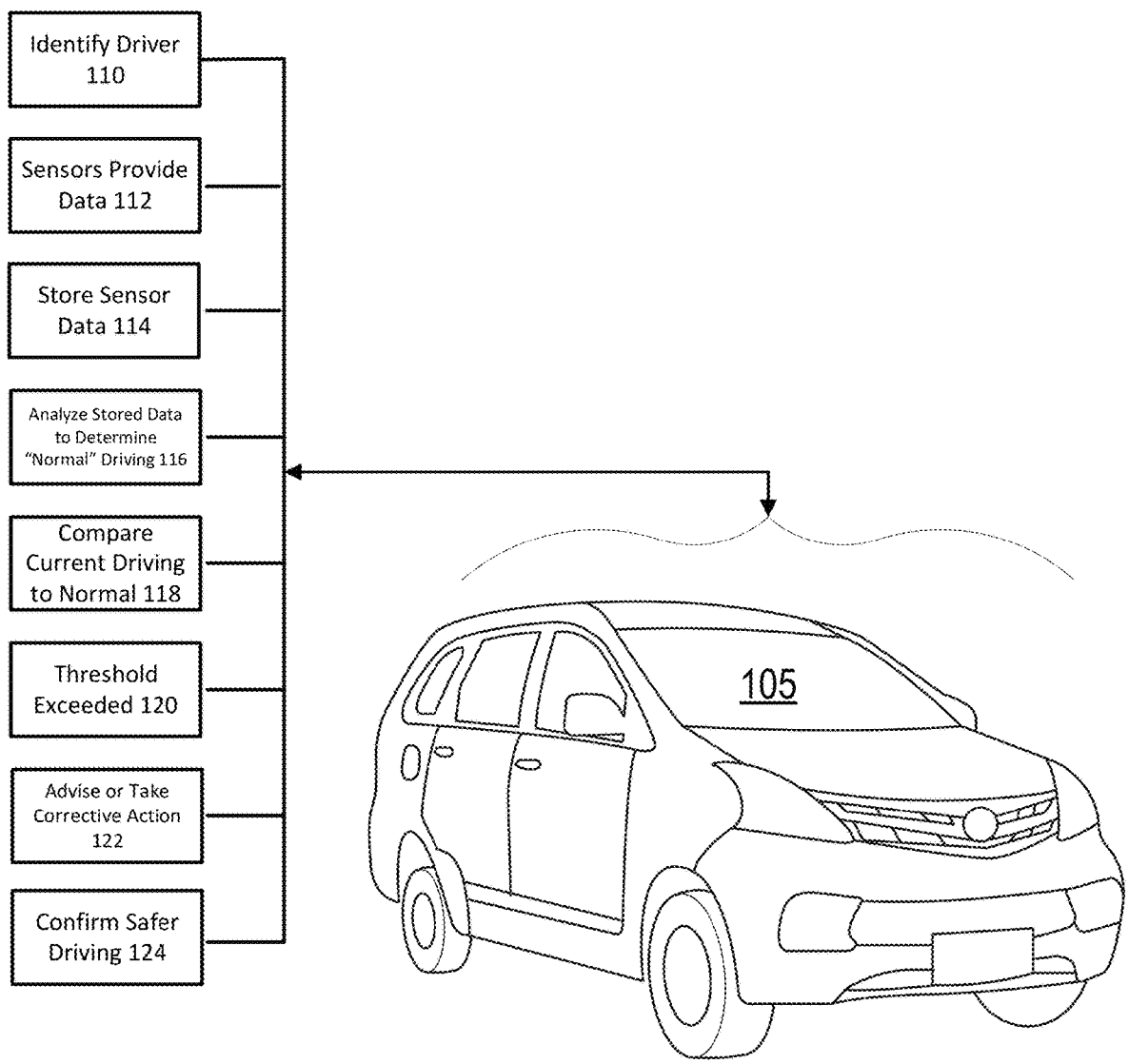
FIG. 1A illustrates aspects of an example transport operation safety enhancing method, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

Referring now to FIG. 1A, an example embodiment is shown of a computer-based method 100 executed by a system for automatically enhancing safe operation of a transport 105. The illustrated method determines the identity of a driver, 110. This may be done in any convenient manner, such as the driver inputting their name on an input device, stating their name to a microphone in the transport, or allowing their face to be recognized by a camera, or the like. System sensors then determine and provide data 112 of attributes of a driving occurrence. For example, data may be obtained from one or more proximity sensors, cameras, accelerometers, and the like, as will be described. The sensor and other data is stored, 114, and analyzed to determine "normal" driving attributes, 116, which is also stored. The normal driving attributes may then be compared to attributes of a current driving occurrence, 118. In the case the difference between the normal driving attributes and the current driving attributes exceeds a certain threshold 120, the system may advise the driver to take corrective action, or the system may automatically implement one or more corrective actions, 122. The system may then confirm that a safer driving condition has been achieved, 124.

Figure 1B:
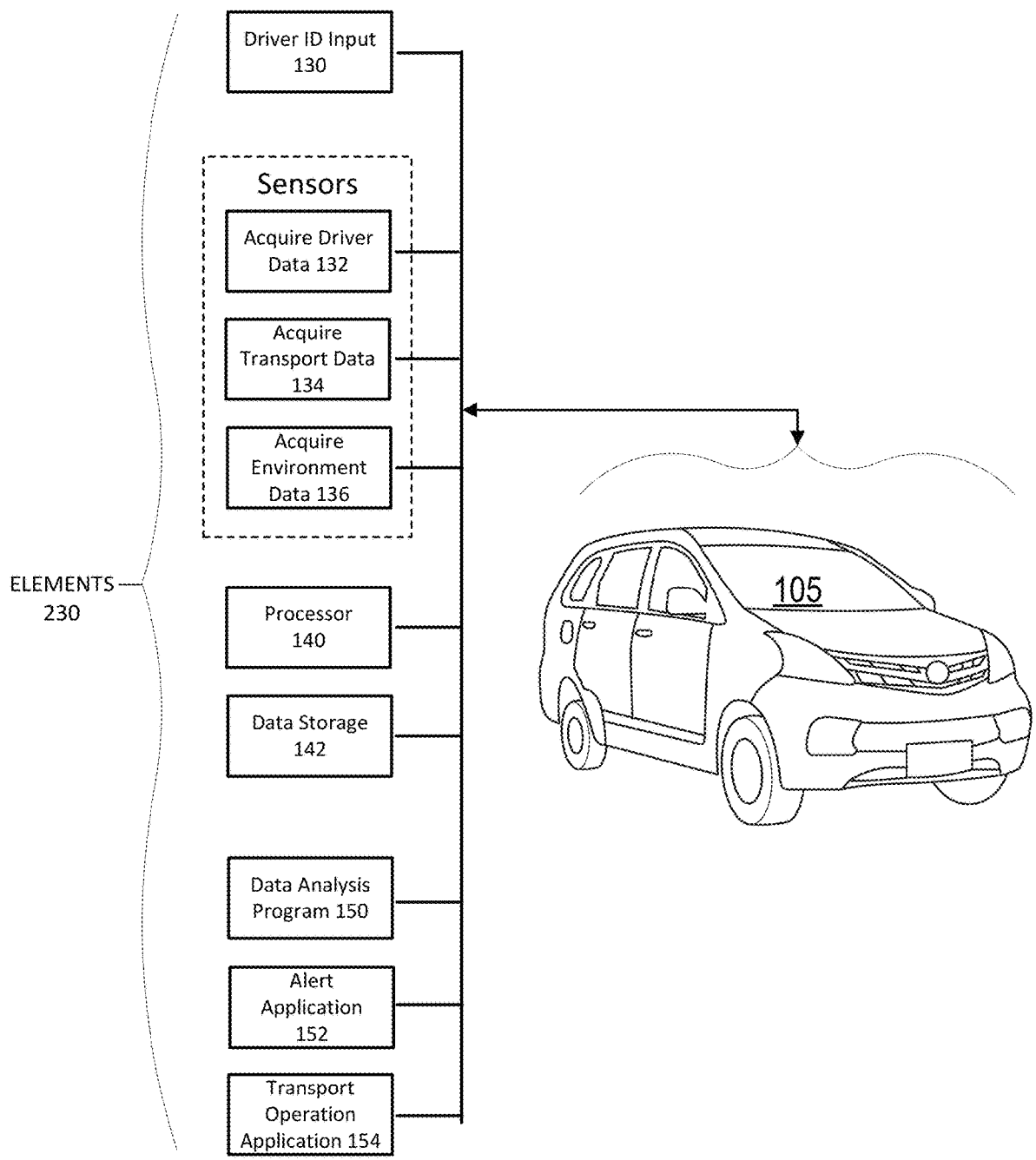
FIG. 1B illustrates aspects of an example transport operation safety enhancing system, according to example embodiments.

FIG. 1B illustrates an example embodiment of a system 101 that executes a method for automatically enhancing safe operation of a transport 105. As shown, an identifier (ID) of a particular driver is input into the system, 130. Thereafter, during a driving occurrence, various data pertaining to the driving occurrence are collected. In the illustrated embodiment, the system 101 may for example, acquire data pertaining to the driver, 132. The system 101 may also acquire data pertaining to the transport, 134, such as its speed and direction, the state of devices such as headlights and windshield wipers. The system 101 may further acquire data pertaining to the environment 136 external to the transport, such as the condition of the road, the time of day and the level of ambient light, the weather, and the like.

The data is provided to a computer processor 140, and stored in a data storage device 142. Data analysis program 150 analyzes the data and stores the results. If appropriate, the processor 140 may launch an alert application 152, which may alert the driver, or others, or both to an unsafe driving condition, and may make recommendations regarding taking action to enhance the safety of people and property. Alternatively or in addition, the processor may launch a transport operation application 154, and may automatically implement safety measures, such as parking the transport on a road shoulder of curb.

FIG. 2A is a diagram illustrating aspects of a transport network 200A, according to example embodiments. The network comprises elements of a transport node 202 including a processor 204, one or more of the elements 230, and a non-transitory computer readable medium 242. The processor 204 is communicably coupled to the computer readable medium 242 and elements 230 (depicted in FIG. 1B).

The processor 204 performs one or more of automatically determining, based on data received from at least one sensor on a transport, a driving behavior associated with a driver of the transport over at least one first period of time as the driver's normal driving behavior, 244A, automatically determining a difference between the driver's normal driving behavior and a second driving behavior currently occurring over a second period of time as the driver's current driving behavior, 246A, and in the case the difference between the driver's normal driving behavior and the driver's current driving behavior indicates the driver's current driving behavior is unsafe, automatically recommend actions to take to operate the transport more safely, 248A. The safer driving behavior may be the operator's normal driving behavior, or another predetermined safe driving behavior such as a "best practices" driving behavior, or the like.

Figure 2B:
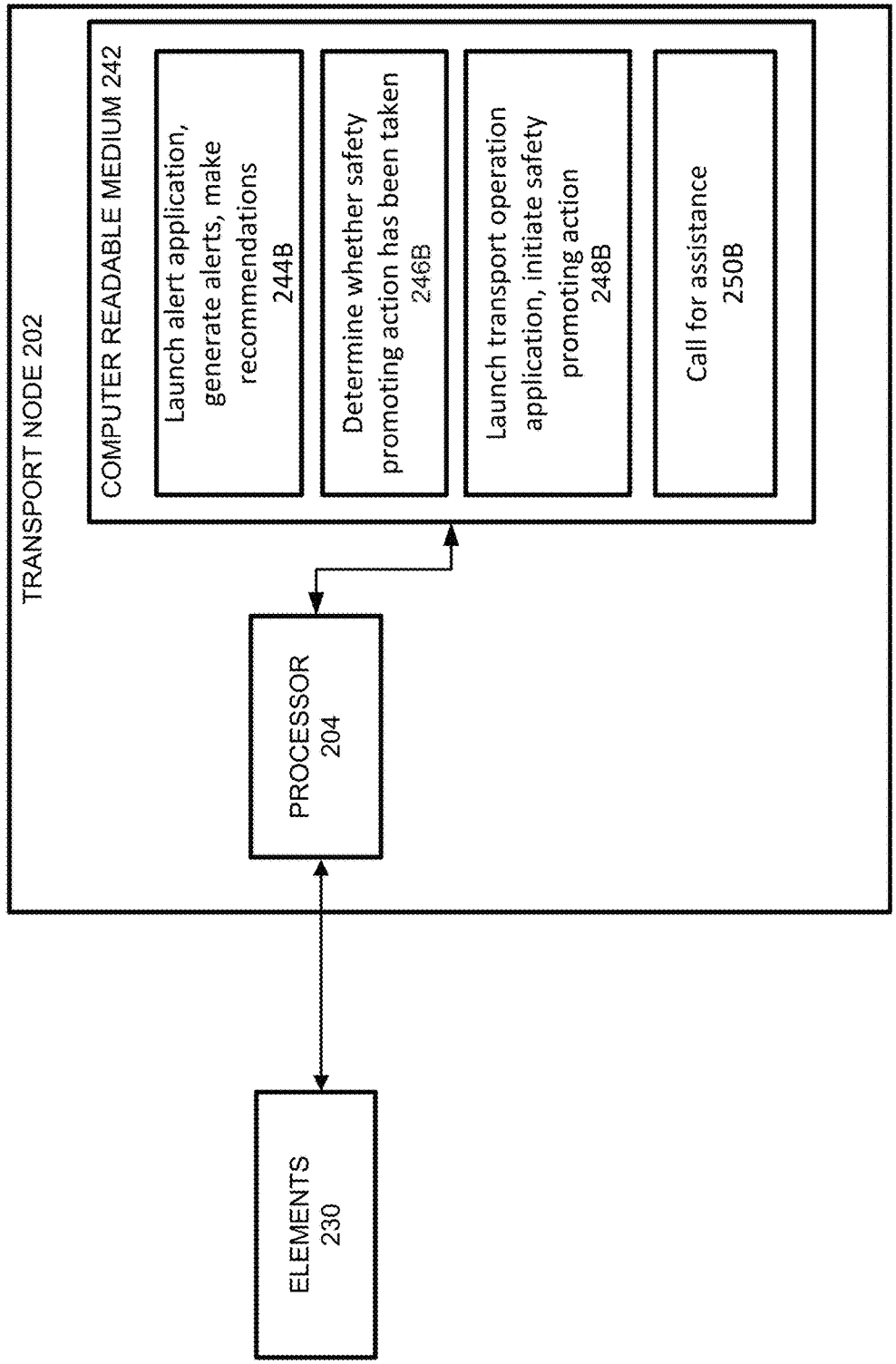
FIG. 2B illustrates another transport network diagram, according to example embodiments.

FIG. 2B is a diagram illustrating aspects of a transport network 200B, which may be further aspects of the transport network 200A, according to example embodiments. As before, the network comprises elements of a transport node 202 including a processor 204, one or more of the elements 230, and a non-transitory computer readable medium 242. The processor 204 is communicably coupled to the computer readable medium 242 and elements 230.

In FIG. 2B, when data analysis program 150 determines unsafe driving behavior is occurring, the processor 204 may launch alert application 152 and generate one or more alerts based on the analysis, 244B. For example, the system may alert the transport driver to the unsafe condition, and may recommend corrective action. In embodiments, an alert may additionally be sent to law enforcement. The processor continues to receive information from sensors and other elements 230, and based on that information may determine whether safety promoting action has been taken, 246B. Further, the processor 204 may launch transport operation application 154 and initiate one or more safety promoting actions, 248B. For example, the system may automatically operate the transport more safely. In embodiments, the operating may comprise automatically turning on hazard lights, or causing the transport to slow down, or causing the transport to maintain a safe distance from a transport ahead or other nearby object, or a combination of these. The transport may also maneuver itself safely off the road and stop on a shoulder, or may park itself adjacent to a curb. In embodiments, the transport may call for assistance, 250B, for example, by contacting a ride-sharing entity and arranging alternate transportation, or calling a known personal contact of the driver, or calling for an ambulance.

The processors and/or computer readable media may fully or partially reside in the interior or exterior of the transport node 202. The steps or features stored in the computer readable medium 242 may be fully or partially performed by the processor 204 and/or other processors or elements in any order. Additionally, one or more steps or features may be added, omitted, combined, performed at a later time, and the like.

Figure 3:
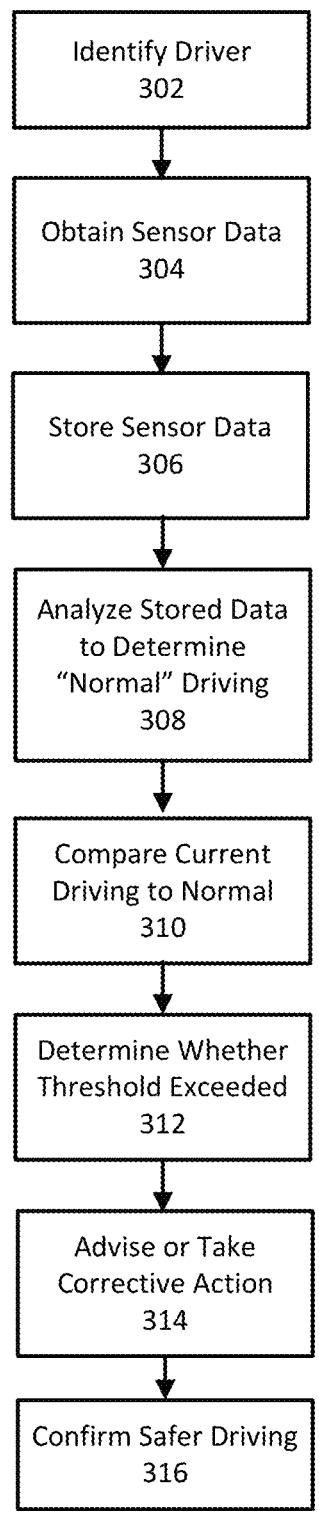
FIG. 3 illustrates a flow diagram, according to example embodiments.

FIG. 3 is a flow diagram 300 illustrating this process. In the figure, the system determines the identity of a driver, 302. As noted previously, this may be done in any convenient manner, such as the driver inputting their name on an input device, stating their name to a microphone in the transport, or allowing their face to be recognized by a camera, or the like. System sensors then determine and provide data of attributes of a driving occurrence, 302. For example, data may be obtained from one or more proximity sensors 304, cameras, accelerometers, etc. The sensor and other data is stored, 306, in a non-volatile data storage device, such as a solid-state drive or disk drive. The computing processor communicatively coupled to the storage device retrieves and analyzes the stored data to determine "normal" driving attributes, 308, which is also stored. The analysis may be or include any convenient method, or using any of a plurality of algorithms. For example, the processor may determine a driver's normal velocity on a limited access highway with unobstructed traffic and a posted speed limit of 65 mph, is 65 mph during daylight hours, 60 mph at night, 55 mph in heavy rain, etc. These may be determined, for example, by taking an average of driving speed when those driving conditions exist. The average may be linear or exponential, or another measure of central tendency of the data may be used, or a normal range may be determined as the low and high values of the transport's speed under those conditions, which may include all relevant data points or with outliers removed.

The normal driving attributes may then be compared to attributes of a current driving occurrence, 310. In the case the difference between the normal driving attributes and the current driving attributes exceeds a certain threshold, 312, the system may advise the driver to take corrective action, or the system may automatically implement one or more corrective actions, 314. The system may then confirm that a safer driving condition has been achieved, 316.

Figure 4:
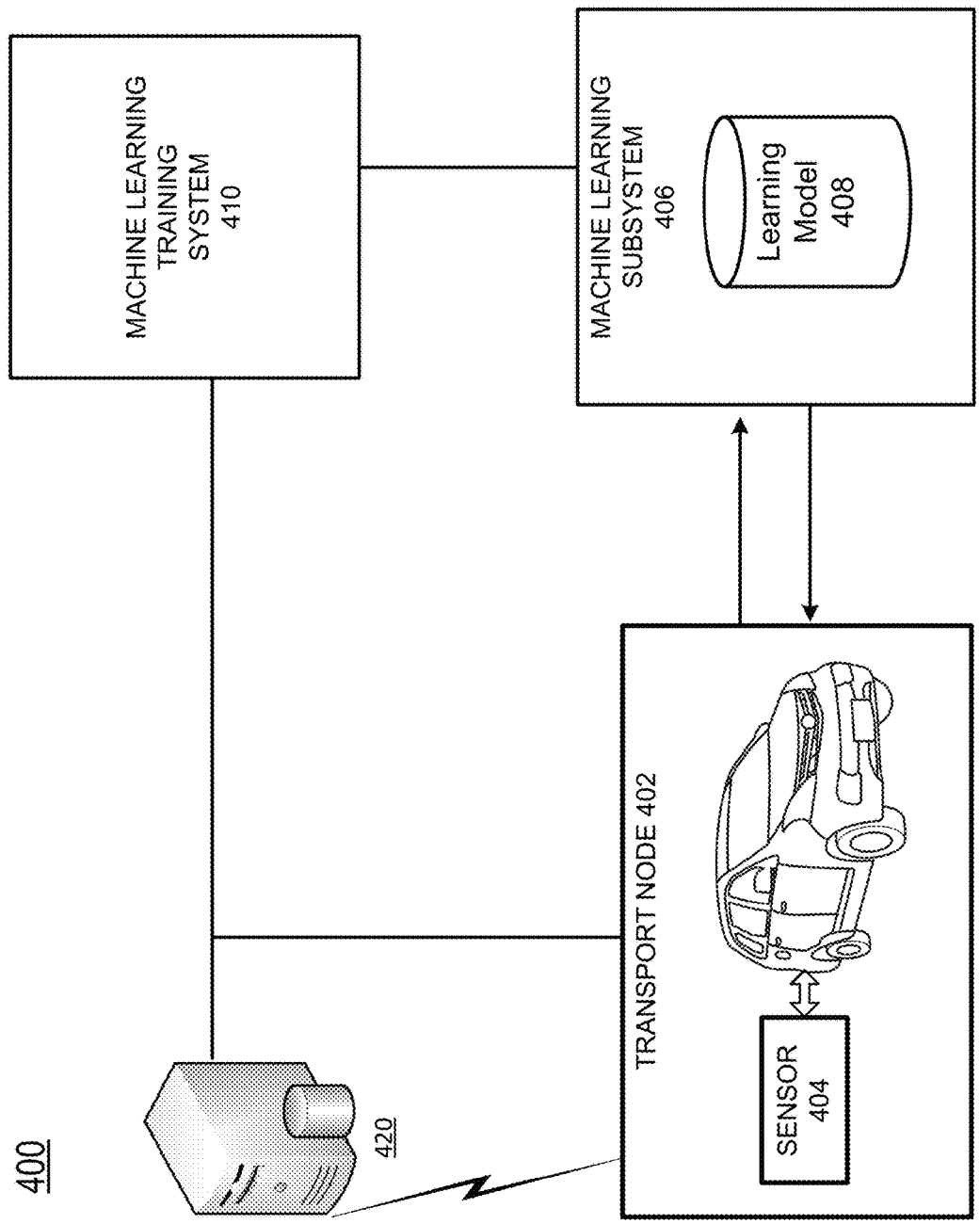
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404. The machine learning subsystem 406 contains a learning model 408 which is a mathematical artifact created by a machine learning training system 410 that generates driving models and driver profiles by finding patterns in a plurality of driving occurrences as training data sets. In some embodiments, the machine learning subsystem 406 resides in the transport node 402. In other embodiments, the machine learning subsystem 406 resides outside of the transport node 402. For example, the transport node 402 may include a wireless transceiver (not shown) to communicate with a server 420 residing on a network, which implements the machine learning system 410 and generates the learning model 408.

Thereafter, the transport node 402 sends data from the one or more sensors 404 to the machine learning subsystem 406. The machine learning subsystem 406 provides the one or more sensor 404 data to the learning model 408 which returns one or more results as output. The results may be or include driving recommendations for the transport driver, or driving instructions to be carried out automatically by the transport 402, or both. The machine learning subsystem 406 sends the recommendations and instructions to the transport node 402 based on the output of the learning model 408.

In a further embodiment, the transport node 402 may further send the one or more sensor 404 data to the machine learning training system 410. In yet another embodiment, the machine learning subsystem 406 may send the sensor 404 data to the machine learning training system 410, which may use the data to refine the learning model 408. One or more of the applications, features, steps, solutions, etc., described and/or depicted herein may utilize the machine learning network 400 as described herein.

Figure 5A:
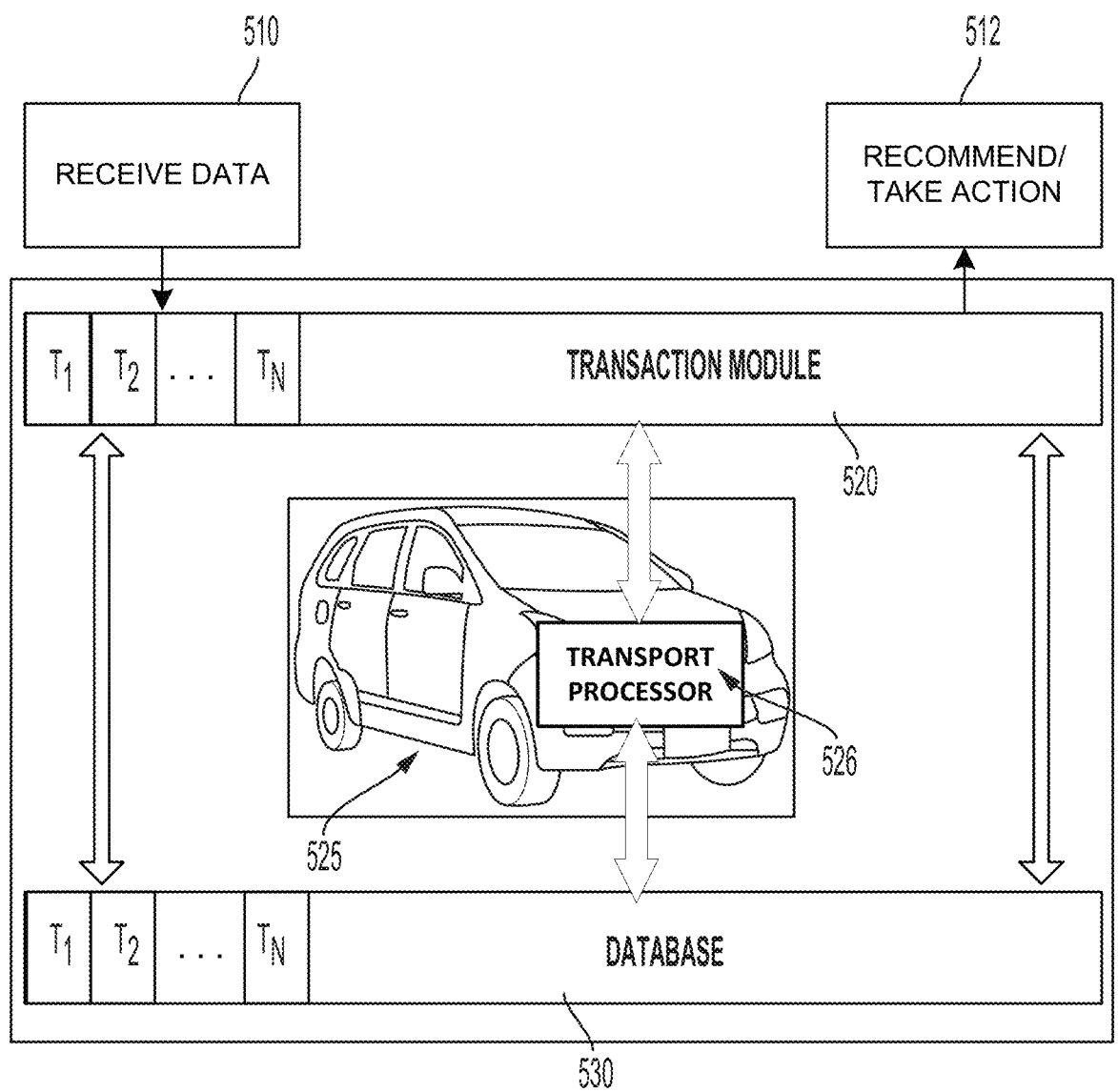
FIG. 5A illustrates an example vehicle configuration for managing database transactions associated with the vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., current driving occurrence data, current recommendation data, current action initiation, etc.), the vehicle may receive data assets 510 and/or output data assets 512 according to current driving characteristics. A transport processor 526 resides in the vehicle 525 and communication exists between the transport processor 526, a database 530, and the transaction module 520. The transaction module 520 may record information, such as a driver ID, sensor information, date, time, location, results, notifications, unexpected events, etc. Those transactions in the transaction module 520 may be replicated into the database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
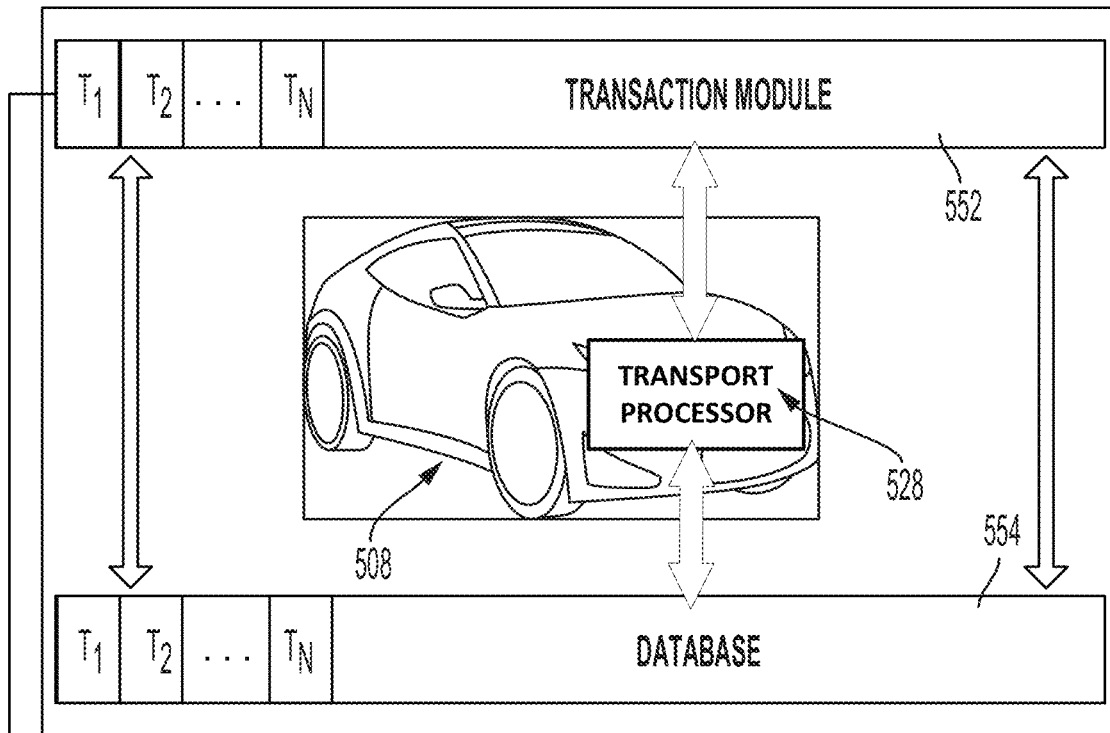
FIG. 5B illustrates another example vehicle configuration for managing database transactions conducted among the transport and another entity, according to example embodiments
Figure 5B:
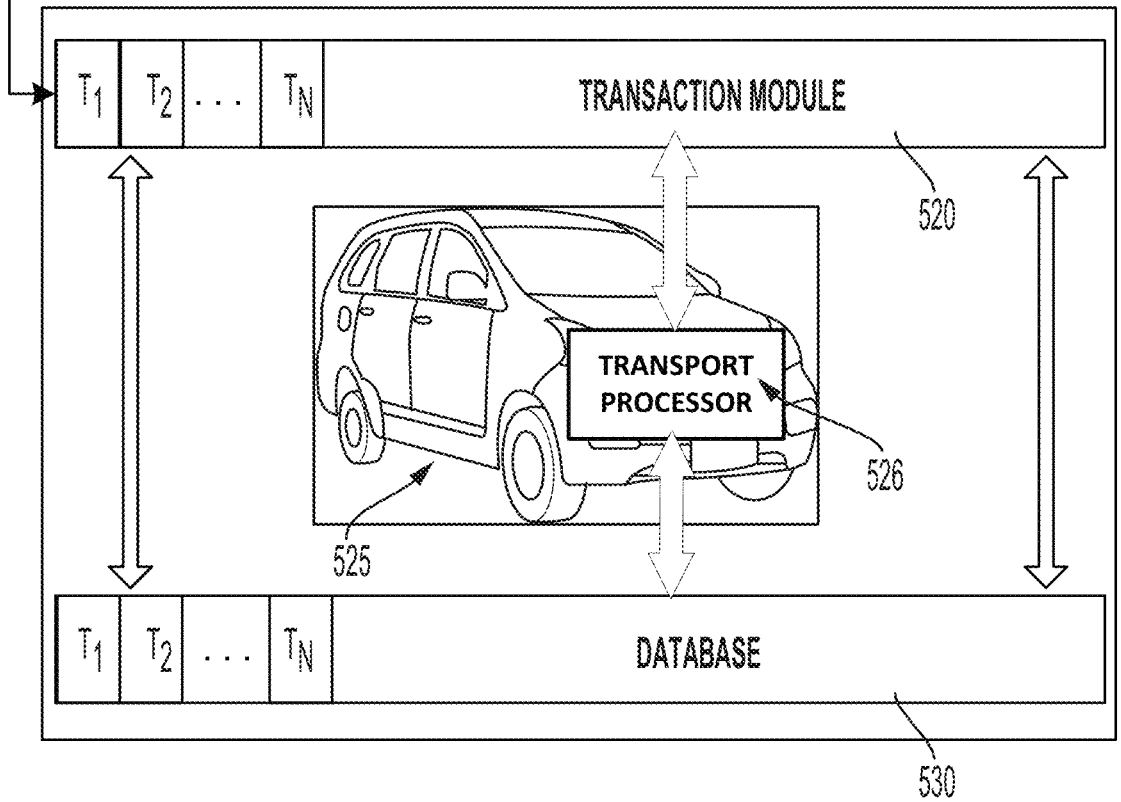

FIG. 5B illustrates an example vehicle configuration 550 for managing database transactions conducted among the transport and another entity, which may be another transport, a network server, or the like, according to example embodiments. The vehicle 525 may engage with another vehicle 508 to perform various actions such as to share, transfer, acquire data, etc. when the vehicle has reached a status where data needs to be shared with another vehicle. For example, the vehicle 508 may be being driven by a contact, such as a family member of the driver of the transport 525, and may share relevant data of unsafe driving. A transport processor 528 resides in the vehicle 508 and communication exists between the transport processor 528, a database 554, a transport processor 528 and the transaction module 552. The vehicle 508 may notify the other vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then provide information via a wireless communication request to request assistance from the vehicle 508 and/or from a server (not shown). The transactions are logged in the transaction modules 552 and 520 of both vehicles. A response may be sent from vehicle 508 to vehicle 525 and the record of the response is logged in the database 530/554 assuming that the blockchains are different from one another, or, are logged in the same blockchain used by both transports 525, 506. The database 554 can be one of a SQL database, an RDBMS, a relational database, a non-relational database, a blockchain, a distributed ledger, and may be on board the transport, may be off board the transport, may be accessible directly and/or through a network.

Figure 6A:
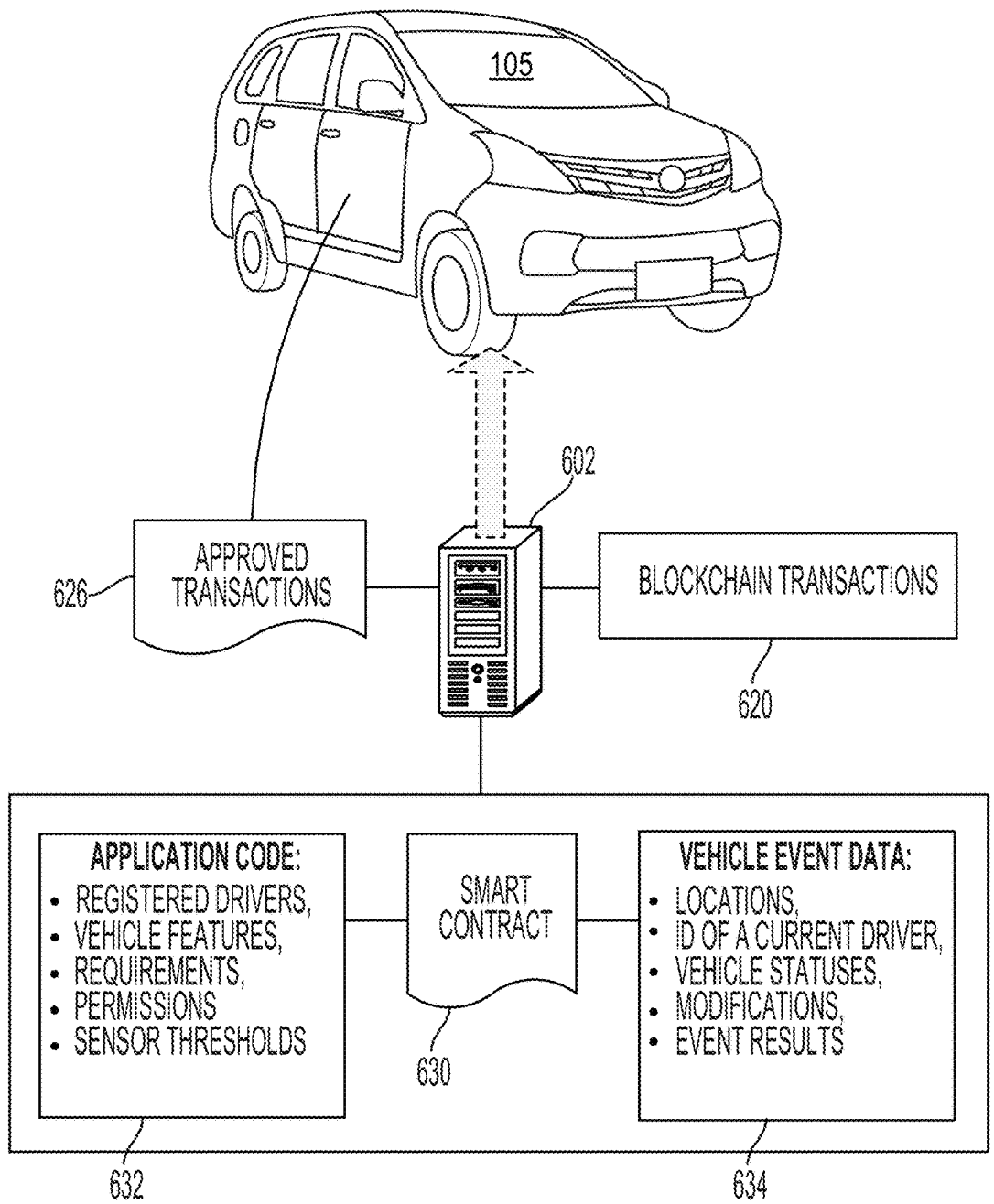
FIG. 6A illustrates a blockchain architecture configuration, according to example embodiments.

FIG. 6A illustrates a blockchain architecture configuration 600, according to example embodiments. Storing data in a blockchain ensures the stored data is immutable. As such, the blockchain can be consulted if needed to recreate conditions surrounding an event of interest, such as an accident involving the transport.

Referring now to FIG. 6A, the blockchain architecture 600 may include certain blockchain elements, for example, a blockchain node 602 (represented as a computer icon for illustrative purposes), comprising elements which may be disposed (represented by the dotted arrow) in a transport 105. In one example embodiment, the blockchain is permissioned. As such, it is accessible only to those with permissioned access to the blockchain data. The blockchain node participates in a number of activities, such as blockchain entry addition and validation. The blockchain node 602 may endorse entries based on an endorsement policy, and may provide an ordering service for all blockchain entries. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in the memory of blockchain node 602 as the transactions are received and approved by the node 602. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define predetermined values, ranges, thresholds, and other conditions and information as terms of transaction agreements and actions included in smart contract executable application code 632, such as registered drivers, vehicle features, requirements, permissions, sensor thresholds, etc. The code may be configured to identify whether requesting entities are authorized to access blockchain data, what data they are permitted to obtain given their profile statuses, and even whether to monitor their actions in subsequent events. For example, when an accident has occurred and stored data is accessed by law enforcement or an insurance company representative, the sensor data monitoring may be triggered, and certain parameters, such as actions taken by such third parties, may be identified as relevant and stored for a particular period of time. The result may be a change to a parameter stored in the application code 632, for example. The relevant parameter data may be entered automatically or manually in any convenient manner.

Sensor data may also be the basis for the vehicle event data 634, such as one or more location(s) of relevant events, an average speed, a top speed, acceleration rates, whether there were any collisions, whether safety measures are in place, whether the vehicle has a preferred level of charge/fuel, etc. All such information may be the basis of smart contract terms 630, which are then stored in a blockchain. For example, sensor thresholds stored in the smart contract can be used as the basis for whether a service, such as a recommendation or automated operation, is necessary and when and where the service should be performed.

Figure 6B:
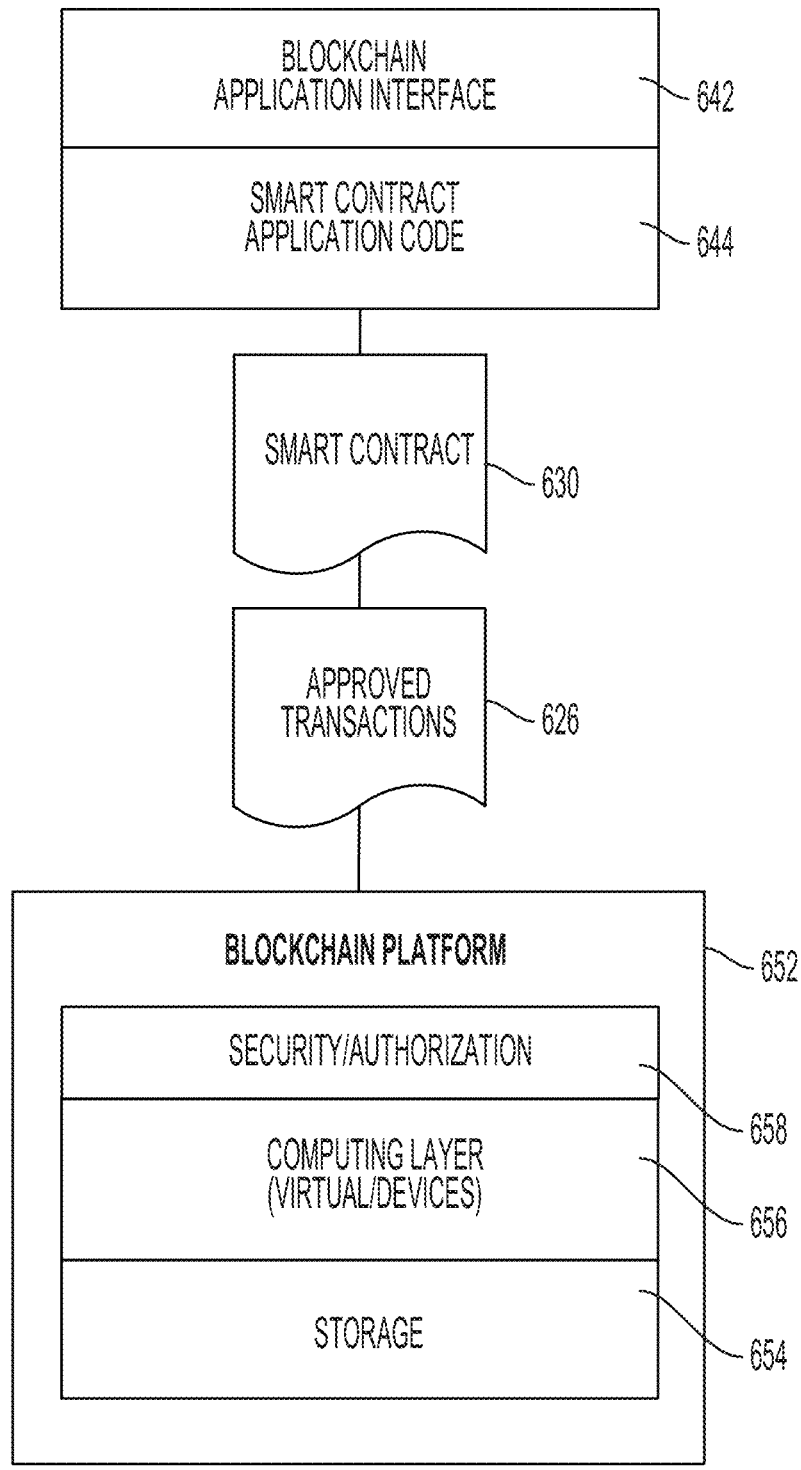
FIG. 6B illustrates a shared ledger configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive sensor data and other information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract. The physical infrastructure may be utilized to retrieve any of the data or information described herein.

Within smart contract executable code, a smart contract may be created via a high-level application and programming language, and then written to a block in the blockchain. The smart contract may include executable code which is registered and stored with the blockchain. An entry may be an execution of smart contract code which can be performed in response to conditions associated with the smart contract being satisfied. The executing of the smart contract may trigger one or more trusted modification(s) to a state of a digital blockchain ledger.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
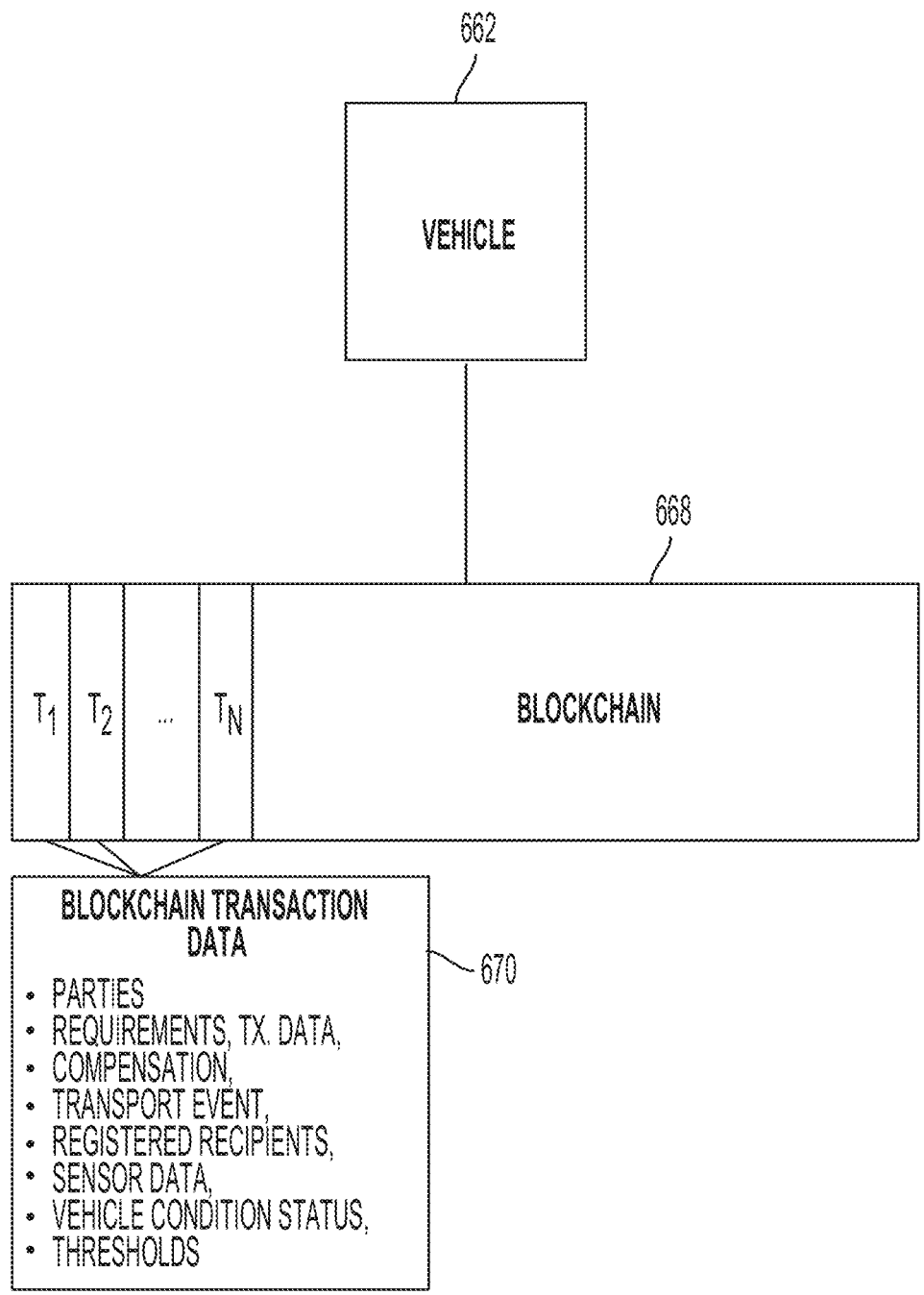
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662 sharing information with a ledger (i.e., blockchain) 668. As driving occurrence events occur, such as the vehicle sensor data indicates a need for fuel/charge, a maintenance service, etc., a smart contract may be used to invoke rules, thresholds, sensor information gathering, etc., which may be used to invoke driving safety enhancement operations. The blockchain transaction data 670 is saved for each transaction event, such as an unsafe driving condition, the subsequent updates to the driving condition, safety improvements, etc. The transactions may include information of the driver, the transport, the environment, safety enhancement requirements (e.g., slow down to avoid a collision), the safety enhancing recommendation and/or action initiated, and a safety enhancing action completed, sensor data relied on during the event and thresholds used to make determinations about whether the vehicle's status has changed.

Figure 6D:
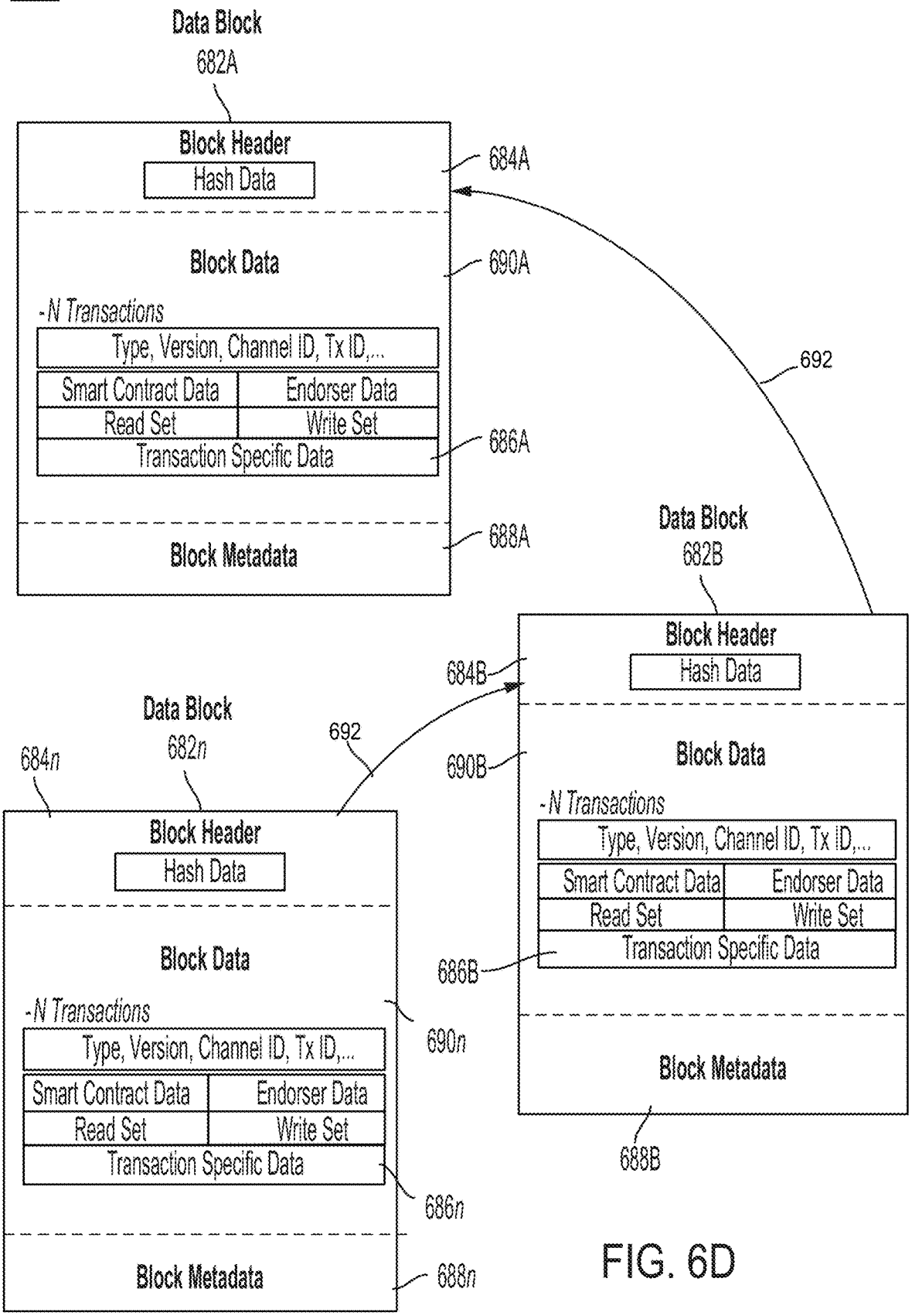
FIG. 6D illustrates blockchain blocks that can be added to a ledger, according to example embodiments.

FIG. 6D illustrates blockchain blocks 680 that can be added to a ledger, according to example embodiments, and contents of block structures 682A to 682n. Referring to FIG. 6D, clients (not shown) may submit entries to the blockchain node 602 to enact activity on the blockchain. As an example, clients may be applications that act on behalf of a requester, such as a device, person or entity to submit entries for the blockchain. Different types of blockchain entities may be present in the blockchain network including an endorsing peer to endorse entries proposed by clients, and a committing peer to verify endorsements, validate entries, and commit entries to the blockchain. In this example, the blockchain node 602 may perform the role of endorser node, committer node, or both.

The instant system includes a blockchain which stores immutable, sequenced records in blocks, and a state database (current world state) maintaining a current state of the blockchain. Different ledgers may exist per channel (e.g., for each driver) and each peer interacts with the ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entries based on simulated results. Endorsing nodes hold smart contracts which simulate the entry proposals. When an endorsing node endorses an entry, the endorsing node creates an entry endorsement which is a signed response from the endorsing node to the client application indicating the endorsement of the simulated entry. The method of endorsing an entry depends on an endorsement policy which may be specified within smart contract executable code. Different channels may have different endorsement policies. Endorsed entries are forward by the client application to an ordering service.

The ordering service accepts endorsed entries, orders them into a block, and delivers the blocks to the committing peer. For example, the ordering service may initiate a new block with each event to be memorialized in the blockchain, or when a threshold of entries has been reached, or when a timer times out, or another condition. In this example, the blockchain node 602 is a committing peer that has received a data block 682A for storage on the blockchain. The ordering service does not process entries, smart contracts, or maintain the ledger(s). Rather, the ordering service may accept the endorsed entries, and specifies the order in which those entries are committed to the ledger. The architecture of the blockchain network may be designed such that the specific implementation of 'ordering' (e.g., Solo, Kafka, BFT, etc.) becomes a pluggable component.

Entries are written to the ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the blockchain node 602 may choose the ordering mechanism that best suits that network, or a default ordering mechanism may be predetermined.

Referring to FIG. 6D, a block 682A (also referred to as a data block) that is stored on the blockchain and/or the ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data, however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
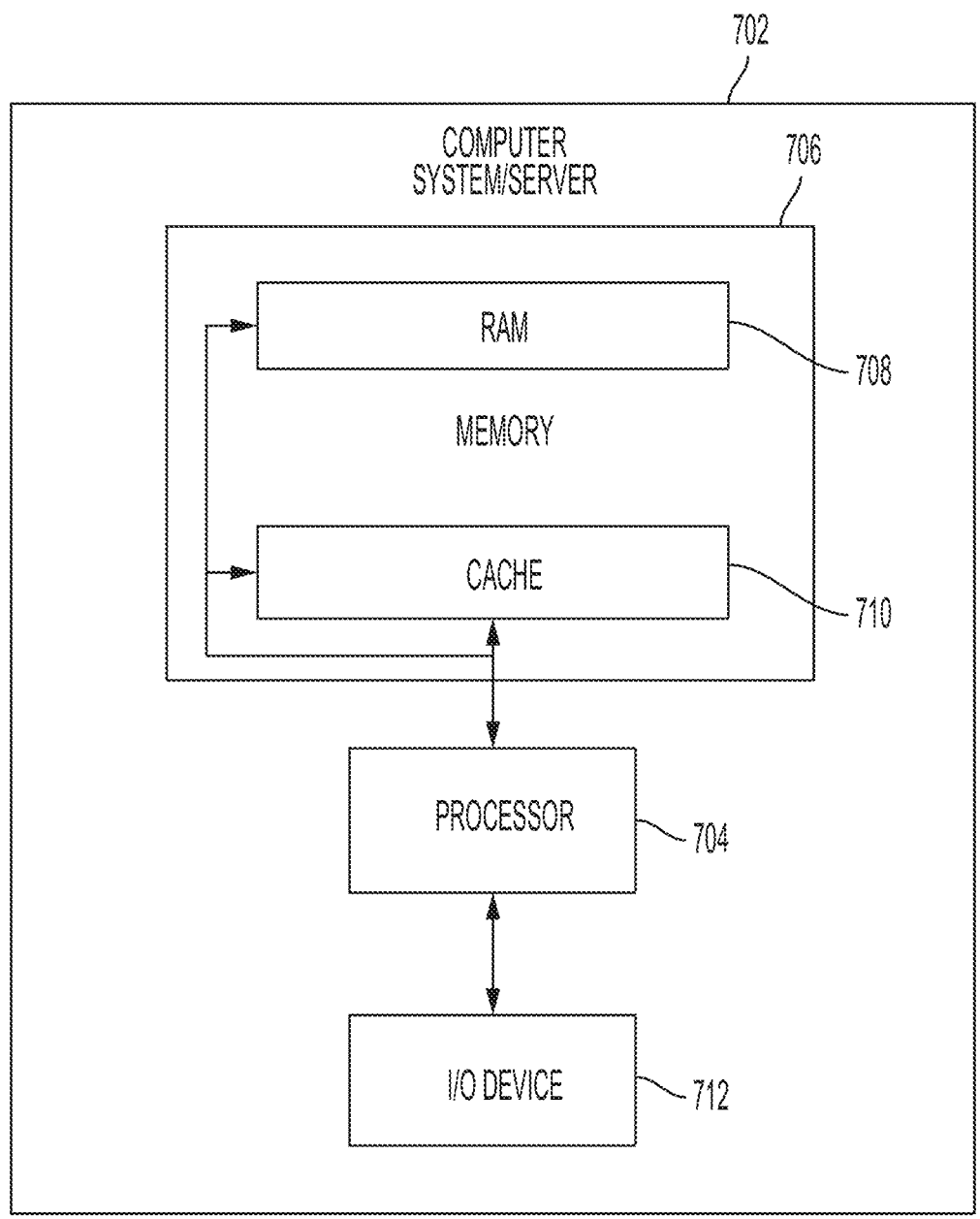
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having at least one set of one or more program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples include, but are not limited to: microcode, device drivers, redundant processing units, external disk drive arrays, RAID systems, tape drives, data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   determining, by a processor based on data received from at least one sensor on a transport, a driving behavior associated with an operator of the transport over at least one first period of time as the operator's normal driving behavior;
   determining by the processor a difference between the normal driving behavior and a second driving behavior currently occurring on a road over a second period of time as the current driving behavior;
   determining a difference between the normal driving behavior and the current driving behavior exceeds a threshold; and
   performing one or more corrective actions to the transport based on the difference between the normal and the current driving behavior, wherein the one or more corrective actions comprise maneuvering by the transport off the road and contacting alternate transportation.

2. The method of claim 1, wherein the normal driving behavior includes at least one predetermined safe driving characteristic.

3. The method of claim 1, further comprising alerting at least one other transport when the difference between the normal and the current driving behavior is identified.

4. The method of claim 1, wherein the corrective actions further comprise at least one of:
   the transport maneuvering itself to maintain at least one predetermined safe distance from at least one other transport;
   the transport maneuvering itself to remain a determined safe distance from at least one object;
   the transport scheduling a ride with a ride-sharing entity;
   the transport slowing;
   the transport turning on hazard lights;
   the transport alerting law enforcement of unsafe driving behavior;
   the transport alerting the operator of the transport of the unsafe driving behavior;
   the transport alerting at least one occupant of the transport who is not the operator of the transport of the unsafe driving behavior;

the transport alerting an operator of at least one other transport of the unsafe driving behavior; and the transport alerting at least one occupant of the other transport who is not the operator of the other transport of the unsafe driving behavior.

5. The method of claim 4, further comprising disabling the transport when the driving behavior continues to be unsafe after a predetermined period of time.

6. The method of claim 1, further comprising:
providing a recommendation prompt to the operator of the transport, via a device associated with the transport, comprising a safer driving behavior, wherein the recommendation is provided by at least one of an audio message, a visual message, a text message, and a multimedia message; and wherein the device associated with the transport comprises at least one of a device operatively coupled to the transport and a device associated with at least one occupant of the transport who is not the operator of the transport.

7. A system, comprising:
a computer processor;
a memory operatively coupled to the processor, wherein the memory stores a plurality of software programs for execution on the processor;
a plurality of sensors operatively coupled to the processor, that generate sensor data that is stored in the memory;
wherein the stored sensor data is analyzed by the processor to determine a driving behavior associated with a particular driver over at least one first period of time as the driver's normal driving behavior;
wherein the processor
determines a difference between the normal driving behavior and a second driving behavior that occurs over a second period of time as the current driving behavior; and
determines a difference between the normal driving behavior and the current driving behavior exceeds a threshold; and
performs one or more corrective actions to the transport based on the difference between the normal and the current driving behavior, wherein the one or more corrective actions comprise the processor being configured to maneuver the transport off a road and contact alternate transportation.

8. The system of claim 7, wherein the normal driving behavior includes at least one predetermined safe driving characteristic.

9. The system of claim 7, wherein the processor is further configured to alert at least one party not in the transport when the unsafe driving behavior occurs.

10. The system of claim 7, wherein the processor is further configured to automatically instruct the transport to perform at least one of:
maneuver itself to maintain at least one predetermined safe distance from at least one other transport;
maneuver itself to remain a determined safe distance from at least one object;
schedule a ride with a ride-share entity;
slow down;
turn on hazard lights;
alert law enforcement of the unsafe driving behavior;
alert the operator of the transport of the unsafe driving behavior;
alert at least one occupant of the transport who is not the operator of the transport of the unsafe driving behavior;

alert an operator of at least one other transport of the unsafe driving behavior; and
alert at least one occupant of the other transport who is not the operator of the other transport of the unsafe driving behavior.

11. The system of claim 10, wherein the automatically instruct operation comprises disablement of the transport when the driving behavior continues to be unsafe after a predetermined period of time.

12. The system of claim 7, further comprising:
a messaging device that prompts the operator of the transport with a recommendation to perform a safer driving behavior, wherein the recommendation is provided by at least one of an audio message, a visual message, a text message, and a multimedia message; and
wherein the messaging device comprises at least one of a device operatively coupled to the transport and a device associated with at least one occupant of the transport who is not the operator of the transport.

13. A non-transitory computer readable medium comprising instructions, that when read by a processor, cause the processor to perform:
determining, by a processor based on data received from at least one sensor on a transport, a driving behavior associated with an operator of the transport over at least one first period of time as the operator's normal driving behavior;
determining by the processor a difference between the normal driving behavior and a second driving behavior currently occurring on a road over a second period of time as the current driving behavior;
determining a difference between the normal driving behavior and the current driving behavior exceeds a threshold; and
performing one or more corrective actions to the transport based on the difference between the normal and the current driving behavior, wherein the one or more corrective actions comprise maneuvering by the transport off the road and contacting alternate transportation.

14. The computer readable medium of claim 13, wherein the normal driving behavior includes at least one predetermined safe driving characteristic.

15. The computer readable medium of claim 13, wherein the instructions further cause the processor to perform alerting at least one other transport when the difference between the normal and the current driving behavior is identified.

16. The computer readable medium of claim 13, wherein the corrective actions further comprise at least one of:
the transport maneuvering itself to maintain at least one predetermined safe distance from at least one other transport;
the transport maneuvering itself to remain a determined safe distance from at least one object;
the transport scheduling a ride with a ride-sharing entity;
the transport slowing;
the transport turning on hazard lights;
the transport alerting law enforcement of the unsafe driving behavior;
the transport alerting the operator of the transport of the unsafe driving behavior;
the transport alerting at least one occupant of the transport who is not the operator of the transport of the unsafe driving behavior;
the transport alerting an operator of at least one other transport of the unsafe driving behavior; and the transport alerting at least one occupant of the other transport who is not the operator of the other transport of the unsafe driving behavior.

17. The computer readable medium of claim 16, wherein the instructions further cause the processor to perform disabling the transport when the driving behavior continues to be unsafe after a predetermined period of time.

\* \* \* \* \*